United States Patent
Chevalier et al.

(10) Patent No.: US 11,609,808 B2
(45) Date of Patent: Mar. 21, 2023

(54) DETERMINATION OF A RELIABILITY STATE OF AN ELECTRICAL NETWORK

(71) Applicant: Schneider Electric Industries SAS, Rueil Malmaison (FR)

(72) Inventors: Marcel Chevalier, Grenoble (FR); Laurent Buchsbaum, Claix (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 25 days.

(21) Appl. No.: 17/175,800

(22) Filed: Feb. 15, 2021

(65) Prior Publication Data
US 2021/0255912 A1    Aug. 19, 2021

(30) Foreign Application Priority Data
Feb. 19, 2020 (FR) ................... FR2001644

(51) Int. Cl.
*G06F 11/00* (2006.01)
(52) U.S. Cl.
CPC ................... *G06F 11/008* (2013.01)
(58) Field of Classification Search
CPC . G06F 1/28; G06F 1/30; G06F 11/008; G06F 11/079; G06F 11/0793
See application file for complete search history.

(56) References Cited

U.S. PATENT DOCUMENTS 6,321,187 B1   11/2001  Squier et al.
8,983,820 B2*   3/2015  Parapurath ............ H04L 43/50
                                                703/21

(Continued)

FOREIGN PATENT DOCUMENTS

CN   107688880 A   2/2018
CN   110276532 A   9/2019

(Continued)

OTHER PUBLICATIONS

Senon G E: "Evaluation Des Performances D'Architectures Multi-ASI : Fiabilite Et Disponibilite", Revue Generale De L'Electricite, RGE. Paris, FR, No. 11, Dec. 1, 1992 (Dec. 1, 1992), pp. 39-44, XP000328978, ISSN: 0035-3116.

(Continued)

*Primary Examiner* — Joseph R Kudirka
(74) *Attorney, Agent, or Firm* — Locke Lord LLP

(57) ABSTRACT

Method for determining a reliability state of an electrical network, the electrical network comprising a plurality of interconnected electrical devices, the method including the following steps:
a) identifying an undesired event at a given location in the electrical network;
b) traversing at least one subset starting from the given location;
c) identifying an electrical device of the electrical network;
d) determining a list of events of concern that are associated with the identified electrical device and could result in the undesired event;
e) determining a total unavailability value associated with the identified electrical device;
f) repeating steps b) to e); and
g) calculating a reliability state of the electrical network on the basis of the total unavailability values respectively associated with the traversed electrical devices.

10 Claims, 2 Drawing Sheets

(56) References Cited

U.S. PATENT DOCUMENTS

2009/0083014 A1    3/2009  Schallert
2017/0177424 A1*   6/2017  Guay ................. G06F 11/0766

FOREIGN PATENT DOCUMENTS

FR    2920893 A1    3/2009
FR    3044787 A1    6/2017

OTHER PUBLICATIONS

Samuel et al., "Fault Tree-Based Reliability Assessment of a 132-kV Transmission Line Protection Scheme", American Journal of Engineering Research, 2013, vol. 2, Issue 10, pp. 100-106.
French Search Report and Written Opinion dated Sep. 8, 2020 for corresponding French Patent Application No. FR2001644, 11 pages.

* cited by examiner

DETERMINATION OF A RELIABILITY STATE OF AN ELECTRICAL NETWORK

TECHNICAL FIELD

The present invention relates to a method for determining a reliability state of an electrical network.

PRIOR ART

The reliability and the quality of operation of an electrical network are essential to ensure the transmission and distribution of electrical power from generation centres to consumers of electricity.

To this end, many risk assessment tools and methods are known for analysing the reliability, the availability, the safety and the maintainability of the electrical network. These methods make it possible to systematically model the interactions between the different elements that make up the electrical network in order to investigate a possible fault in the electrical network and to derive therefrom the various malfunctions of said network.

By way of example, the document "Fault Tree-Based Reliability Assessment of a 132-kV Transmission Line Protection Scheme", Samuel et al., American Journal of Engineering Research, 2013, volume 2, issue 10, pages 100-106, describes a case study in which a general failure of a 132-kV transmission line is analysed by producing a fault tree.

A fault tree of this kind is constructed by starting from an undesired event, then imagining the possible intermediate events that would explain the undesired event, and then considering each intermediate event as a new undesired event. Thus the fault tree is produced by progressively moving down through the tree to the basic events and by imagining the possible causes of each event at the level under consideration.

This method, which is known per se, may however prove time-consuming to implement since, from the start of its implementation, it requires a complete representation of the electrical network to be taken into account.

Furthermore, this method is more particularly suited to a general failure, such as described in the document mentioned above relating to a transmission line, but is less suitable when it comes to finding out the causes of failure at another given location in the electrical network.

Thus, the aim of the invention is to propose a method for determining a reliability state of an electrical network that is particularly simple to implement.

SUMMARY

The invention improves the situation.
What is proposed is a method for determining a reliability state of an electrical network, the electrical network comprising a plurality of interconnected electrical devices, the electrical network being modelled by a single-line representation, the method comprising the following steps:
a) identifying an undesired event at a given location in the electrical network, the undesired event corresponding to a critical state of the electrical network resulting in partial or total, temporary or permanent unavailability of electrical power at the given location;
b) traversing at least one subset comprising electrical devices of the plurality of electrical devices of the electrical network starting from the given location;
c) identifying an electrical device of the subset of the electrical network traversed in step b);
d) determining a list of events of concern that are associated with the identified electrical device and could result in the undesired event, the events of concern corresponding respectively to causes likely to result, alone or in combination, in the undesired event;
e) determining a total unavailability value associated with the identified electrical device taking into account said list of events of concern, and the unavailability rates and the repair times respectively associated with each event of concern in the list of events of concern;
f) repeating steps b) to e), the method being interrupted once a predefined number, which is greater than or equal to two, of electrical protection devices have been traversed in the subset; and
g) calculating a reliability state of the electrical network on the basis of the total unavailability values respectively associated with the traversed electrical devices.

Thus a method is obtained which is simple and easy to implement in order to determine the causes of a failure at any location in an electrical network and also the reliability that can be expected.

According to one embodiment, at least one electrical device of the electrical network is chosen from among a transformer, a switch, a circuit breaker, a contactor, a disconnector, a busbar, a battery, a protection relay, monitoring equipment, control equipment and telecommunication equipment.

According to another embodiment, the electrical network comprises at least one real electrical device and at least one virtual electrical device, the virtual electrical device being configured to model a relationship between elements of the electrical network, and more particularly between elements of the electrical network that are critical to the operation thereof.

According to another embodiment, the method is interrupted once a virtual electrical device is identified in step c) of the method.

Thus, only the critical portions of the network are taken into account by the method, which makes it possible to rapidly analyse the reliability of the electrical network.

According to another embodiment, the given location in the electrical network corresponds to a location of a busbar.

According to another embodiment, starting from the given location, the subset is traversed upstream, i.e. towards at least one electrical power source of the electrical network, and/or downstream, i.e. towards at least one electrical load of the electrical network.

According to another aspect, what is proposed is a computer program comprising instructions which, when the program is executed by a processor, lead to the implementation of the method according to the invention.

According to another aspect, what is proposed is a processing device on which a computer program comprising instructions for implementing the method according to the invention is recorded.

BRIEF DESCRIPTION OF THE DRAWINGS

Other features, details and advantages will become apparent upon reading the description provided below and upon examining the appended drawings, in which.

DESCRIPTION OF THE EMBODIMENTS

The drawings and description below contain, for the most part, elements which are certain in nature. They may therefore not only serve to better elucidate the present disclosure, but also contribute to the definition thereof, where appropriate.

Electrical Network

Figure 1:
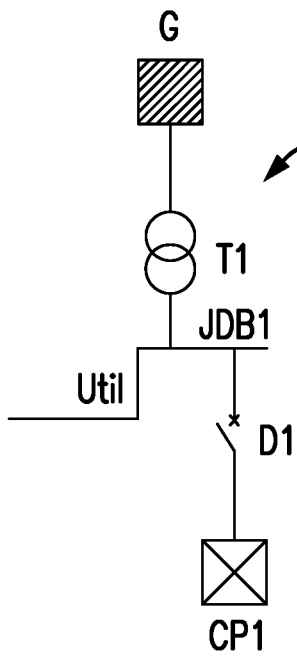
FIG. 1 is a simplified single-line diagram of an electrical network.

FIG. 1 illustrates an example of a single-line diagram of an electrical network 1, in particular a medium-voltage and/or high-voltage electrical network 1.

Hereinafter, the terms "medium voltage" and "high voltage" are used as commonly accepted, namely with "medium voltage" referring to a voltage that is higher than 1000 volts AC and 1500 volts DC, but not higher than 52 000 volts AC and 75 000 volts DC, while the term "high voltage" refers to a voltage that is strictly higher than 52 000 volts AC and 75 000 volts DC.

The electrical network allows electrical power to be transmitted and distributed, in particular by connecting at least one electrical power source G to one or more loads CP1. The electrical power source G may be of any type, in particular a fossil fuel-based or renewable electrical power source.

Between the electrical power source G and the loads CP1, the electrical network comprises a plurality of electrical devices, which may be distributed in electrical substations (not illustrated).

The electrical devices provide for functions of powering on or off, controlling, measuring and/or protecting some or all of the electrical network.

Non-exhaustively and purely illustratively, an electrical device may be chosen from among a transformer, a switch, a circuit breaker, a contactor, a disconnector, a busbar, a battery, a protection relay, monitoring equipment, control equipment and telecommunication equipment.

However, any electrical device which is known per se and can be used in an electrical network may be envisaged according to the invention.

For the sake of simplicity and to aid understanding, the example of a single-line diagram 1 illustrated in FIG. 1 comprises a limited number of electrical devices. In particular, FIG. 1 illustrates only a transformer T1, two busbars Util, JDB1 and a circuit breaker D1. However, the invention can be extended to more complex electrical networks that comprise a greater number of electrical components. According to some examples, the electrical network may comprise over a hundred or even over a thousand electrical devices. Likewise, the electrical network may comprise a greater number of connected loads and electrical power sources.

On the basis of the single-line diagram 1 of the electrical network as illustrated in FIG. 1, the aim of the invention is to determine a reliability state at a given location in the electrical network.

Method

Figure 2:
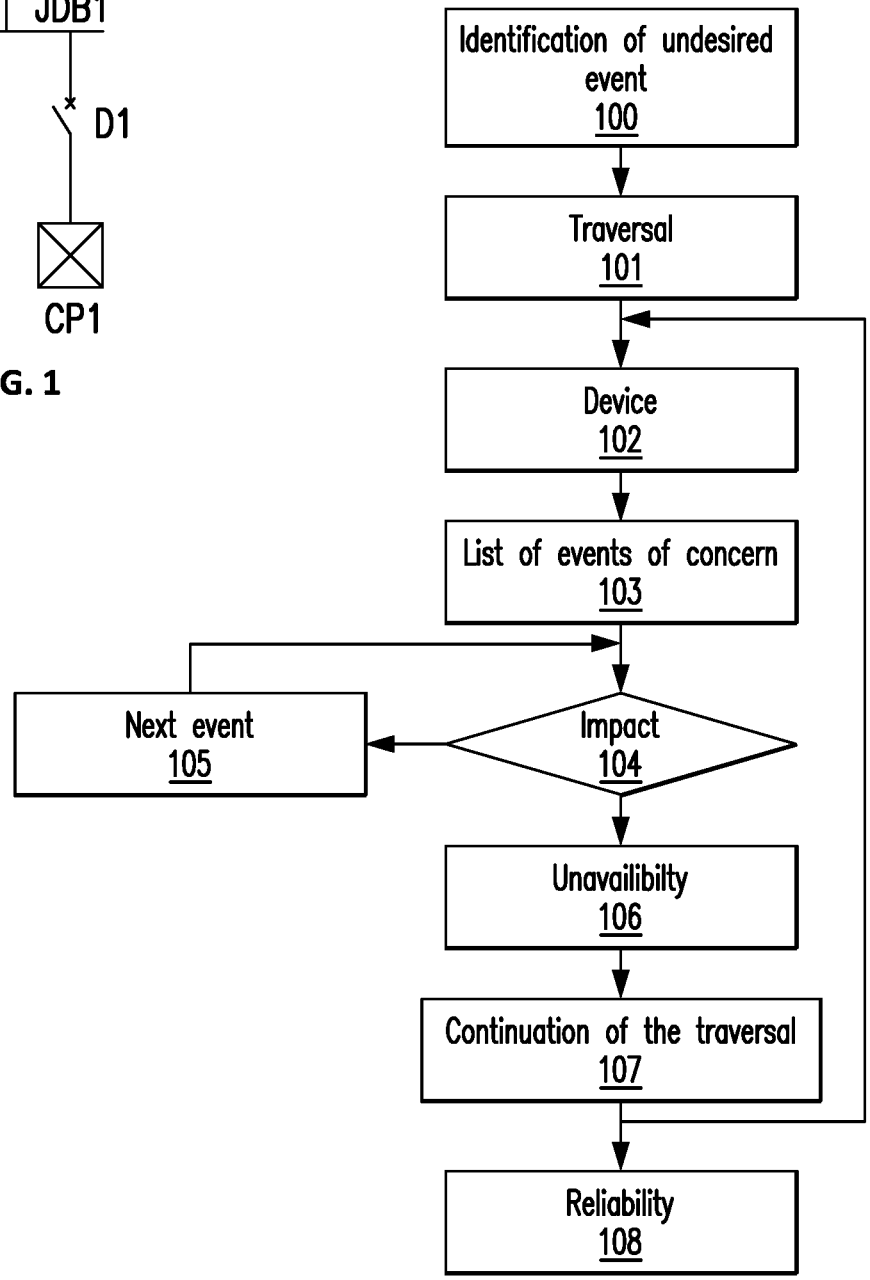
FIG. 2 is a schematic representation of one embodiment of the method according to the invention.

The method according to the invention is described hereinafter in relation with FIG. 2.

Before the method is implemented, a representation, in particular a single-line representation, of the electrical network that is intended to be investigated, has to be modelled.

During modelling, each location or node of the network is attributed one or more parameters allowing the operating state thereof to be simulated. A node of the network may thus comprise one or more electrical devices, electrical loads or sources.

An electrical device taken into account during modelling may be a real or virtual device.

A "virtual electrical device" is understood to mean a device which does not physically exist in the electrical network but which, when modelled, makes it possible to simplify the assessment of the reliability state during the implementation of the method. By way of example, a virtual electrical device may allow various nodes of the electrical network to be connected electrically and virtually.

In a first step 100 of the method, an undesired event, which corresponds to a failure or malfunction at a given location in the electrical network, is first identified.

A "given location" is understood to mean any point in the electrical network that corresponds in particular to the location of an electrical load or device. A given location may in particular be situated at a location different from that of the one or more electrical power sources.

The given location may in particular be the location of a busbar of an electrical substation, allowing the connection of various electrical loads and the branching of the electrical network.

A "failure or malfunction" is understood to mean a critical state of the electrical network resulting in partial or total, temporary or permanent unavailability of electrical power at the given location.

Once the undesired event has been identified, the method consists in traversing the single-line diagram starting from the given location (step 101).

In particular, the single-line diagram is traversed upstream and/or downstream starting from the given location.

"Upstream and/or downstream" is understood to mean respectively that the single-line diagram is traversed starting from the given location towards the electrical power source and/or towards the electrical loads, respectively.

Each time there is an electrical device on the path of traversal of the single-line diagram (step 102), the method comprises a plurality of steps allowing an unavailability value associated with the electrical device in question to be determined.

To this end, one or more events of concern are associated with each electrical device (step 103). Each event of concern corresponds to a cause leading to a failure or malfunction for the device in question and likely to result, alone or in combination, in the undesired event.

By way of example, the events of concern for a circuit breaker may be connected to a mechanical malfunction, such as an insulation fault, an opening fault or a premature trip.

The events of concern may also be connected to a malfunction or an unavailability at another electrical device arranged upstream or downstream of the electrical device in question. Thus, a short circuit downstream of the electrical device is likely to propagate through the electrical network and result in unavailability upstream. According to another example, an upstream electrical power source malfunctioning may lead to an unavailability downstream if no other source is available to provide the required power. Thus, whether the single-line diagram is traversed upstream or downstream may depend on the undesired event in question.

It is thus determined whether each event of concern associated with the device in question is likely to result, alone or in combination, in the undesired event (step 104).

If the event of concern is likely to result in the undesired event, it is taken into account in the calculation of the unavailability value of the electrical device in question. The method is in particular repeated to take into account all the events of concern (step 105).

An unavailability value of an event of concern j may be calculated according to various parameters, in particular on the basis of a mean time to failure of an electrical device. In particular, an unavailability value of an event of concern j may be calculated, in a first approximation, as being the product of an unavailability rate $t_{ind}$ and a repair time $T_{repair}$ for an event of concern j, such that:

[Math. 1]

$$Ind_j = t_{ind,j} \times T_{repair,j}$$

The failure rate $t_{ind}$ corresponds to the probability of the event of concern occurring.

The repair time $T_{repair}$ corresponds to the time needed to fix the failure or malfunction of the electrical device. The repair time $T_{repair}$ may be dependent on local parameters, such as the type of electrical device in question, where said device is situated in the electrical network, the repair policies provided, the obtaining of spare parts for the repair, the options for reconfiguring the electrical network, etc.

The repair time $T_{repair}$ may thus vary significantly depending on the electrical device in question, in particular whether the device needs to be entirely replaced or merely serviced in order to be operational again.

A total unavailability value $ind_{total}^i$ associated with an electrical device i for all the events of concern j is obtained (step 106).

The total unavailability value $ind_{total}^i$ may in particular be equal to the sum of the unavailability values of each event of concern j associated with the electrical device i, respectively, such that:

[Math. 2]

$$Ind_{total}^i = \Sigma_{j=1}^n Ind_j$$

Once the total unavailability value has been calculated for the electrical device i, the single-line diagram is traversed as far as the next electrical device i+1 (step 107), namely the next electrical device i+1 that is electrically connected to the electrical device i. In the case of a new electrical device, steps 102 to 107 are then repeated.

When the same electrical device is traversed several times, the total unavailability value is not necessarily recalculated, but can be considered to be equal to that calculated for the identical electrical device that has been traversed before.

The method according to the invention may be interrupted on the basis of one or more interruption criteria, which make it possible to take into account only a portion of the electrical network and thus limit the computation time and computational requirement.

According to one embodiment, the method may be interrupted once a virtual electrical device, rather than a real electrical device, is traversed. This is because, although a virtual element is modelled in the electrical diagram under consideration, a virtual device cannot propagate the failure or malfunction of the electrical network.

According to another embodiment, the method may be interrupted once a predefined number, which is for example greater than or equal to two, of electrical protection devices have been traversed without reaching an electrical power source. This makes it possible to limit the computation time needed to implement the method, while eliminating the remainder of the traversal, which would have a negligible impact on the final reliability calculation. A protection device may be of circuit breaker or switch type, or may more generally be any device that makes it possible to interrupt the current and thus isolate a portion of the electrical network.

The number of electrical protection devices to traverse before the method is interrupted may be higher, in particular for applications requiring higher reliability precision.

A total unavailability value is thus obtained for each electrical device. An overall reliability of the electrical network can then be calculated (step 108). The overall reliability, or the reliability state, of the electrical network may thus be a measurement of the capability of the electrical network to provide a required electrical power. More particularly, this overall reliability may thus be a probability of no failure or malfunction occurring for a determined period of time for the subset in question on the basis of the unavailability value of each of the electrical devices. Corrective or maintenance actions can be implemented based on this overall reliability.

The method according to the invention is thus carried out step by step, by analysing the electrical devices that are connected to one another in succession, one after the other, by traversing the single-line diagram starting from the given location.

The method may traverse only a subset of the single-line diagram that is specific to the undesired event in question. It is therefore not necessary to traverse the whole of the single-line diagram. A "subset" is thus understood to mean a portion of the electrical network comprising electrical devices that are electrically connected to one another.

Figure 3:
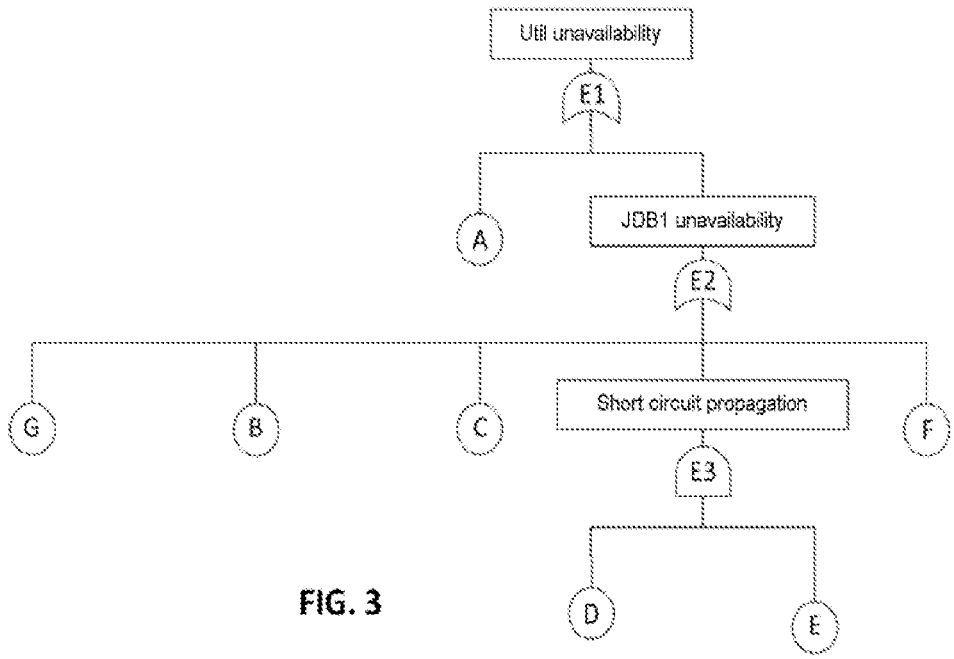
FIG. 3 is a representation of a fault tree obtained by implementing the method according to the invention for the single-line diagram of FIG. 1.

FIG. 3 is a graphical representation relating to the single-line diagram in FIG. 1. More precisely, FIG. 3 is a fault tree (FT), i.e. an engineering technique used in assessments of the safety and reliability of static systems.

A fault tree consists in graphically representing the possible combinations of events that allow a predefined undesired event to be produced. A graphical representation of this kind thus shows cause and effect relationships.

In a manner known per se, the fault tree comprises logic connectors (or logic gates) that form the connections between the various branches and/or events. The connectors operate as follows:

OR: the output/higher-level event occurs if at least one of the input/lower-level events occurs/is present;
AND: the output/higher-level event occurs only if all the input/lower-level events occur/are present (a failure combination also known as a "pair"); and
K/N: in the form of a majority vote, the output/higher-level event occurs if at least K (which is an integer for parametrizing the behaviour of the gate) of the N input/lower-level events occur/are present.

According to the embodiment shown in FIG. 3, the undesired event E1 consists in an unavailability of electrical power at the busbar Util.

The events of concern associated with the busbar Util are a failure of the busbar Util, A and the absence of a supply of electrical power to the busbar JDB1, E2. Since the two events of concern A and E2 are independent (connected by an "OR" connector), the following is thus obtained:

[Math. 3]

$$Ind_{Util} = Ind_A + Ind_{E2}$$

The single-line diagram is also traversed upstream as far as the busbar JDB1.

The events of concern associated with the busbar JDB1 are a failure of the circuit breaker D1, G, a failure of the busbar JDB1, B, a failure of the transformer T1, C, the propagation of a short circuit from downstream E3, and an unavailability of electrical power for the electrical network F.

[Math. 4]

$$Ind_{jDB1} = Ind_{E2} = Ind_G + Ind_B + Ind_C + Ind_{E3} + Ind_F$$

The event E3 relating to the propagation of a short circuit is derived from two lower-level events, namely the circuit breaker D1 not opening, D, and a short circuit on the electrical load CP1, E. In particular, since the two events D and E are dependent on one another (connected by an "AND" connector), the following is thus obtained:

[Math. 5]

$$Ind_{E3} = Ind_D \times Ind_E$$

The single-line diagram can then be traversed upstream as far as the transformer T1, with all the events of concern associated with the transformer (failure of the transformer and absence of a supply of electrical power to the busbar) being listed, and so on as far as the electrical power source or until an interruption criterion.

The single-line diagram can finally be traversed downstream as far as the electrical load CP1, with all the events of concern that are associated with each electrical device and could lead to the undesired event being listed.

These other events are not, however, taken into account in the fault tree in FIG. 3.

Once the events of concern have been identified for each of the electrical devices (only for the busbars Util and JDB1 in the example illustrated by FIG. 3), a value characterizing the reliability state of the electrical network can be calculated:

[Math. 6]

$$Ind_{util} = Ind_{E1} = Ind_A + Ind_G + Ind_B + Ind_C + Ind_D \times Ind_E + Ind_F$$

It is also possible to determine a criticality associated with the undesired event, for example by using failure mode, effects and criticality analysis (FMECA). Depending on the criticality value obtained, provision may be made for performing corrective actions on the electrical network, with the causes of the events of concern that have the highest criticality values being addressed as a priority.

Processing Device

Figure 4:
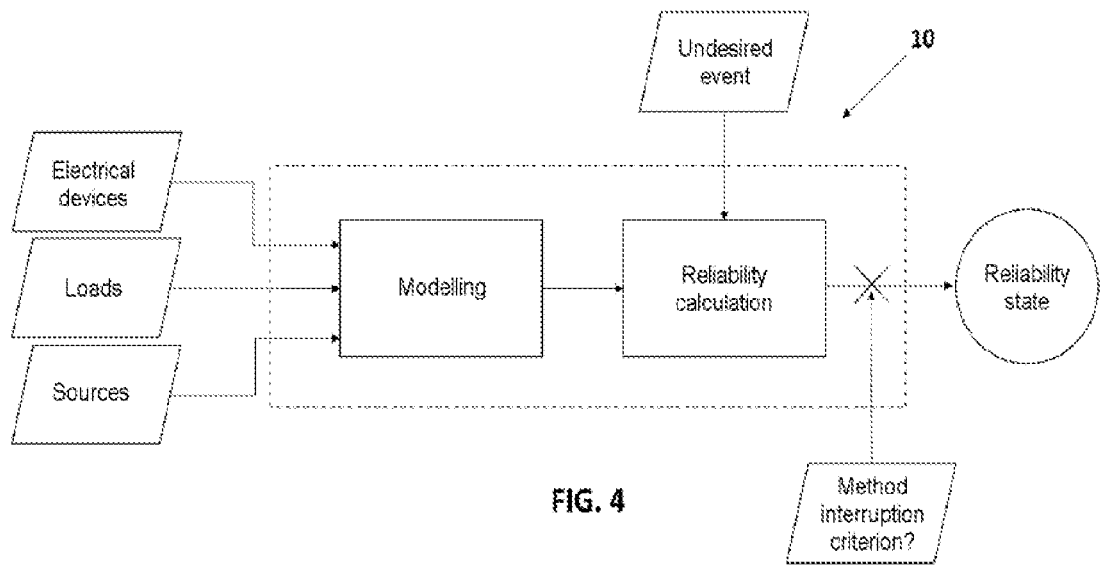
FIG. 4 is a block representation of a processing device configured to implement the method according to the invention.

In order to implement the method described above, the invention also relates to a processing device 10 illustrated in FIG. 4, such as a computer or any other means having computing capability, in particular by means of a processor. The processing device 10 may also comprise a graphical user interface or a textual user interface allowing interaction with a user.

Before the method is implemented, the user can produce, via a modelling unit, a graphical representation in the form of a single-line diagram of the electrical network. The single-line diagram may be stored in the processing device 10, for example in the format of an XML file.

The single-line diagram is made up of various components stored in a database of the processing device 10 or of a remote server. The components are chosen from among electrical devices, electrical loads and sources and are arranged at the nodes of the electrical network. Each electrical device is assigned failure modes corresponding to the events of concern and also to the associated unavailability rates and repair times.

On the basis of the single-line diagram of the modelled network, the value characterizing the reliability state of the electrical network can be determined via a computing unit. The computing unit takes into account the undesired event in question and implements the steps of the method as described above.

The computing unit, including the method, which may be interrupted by an interruption criterion, allows the reliability state of the electrical network to be obtained as the output.

Of course, the invention is not limited to the embodiments described above, which have been provided only by way of example. It encompasses various modifications, alternative forms and other variants that a person skilled in the art will be able to envisage in the context of the present invention, and in particular any combination of the various operating modes described above, which may be taken separately or in combination.

In particular, although the method has been described for an electrical network, it is applicable to other types of network allowing transport and distribution, such as a hydraulic or pneumatic network or the like, for which it is necessary to determine a reliability state of the network.

The invention claimed is:

1. A method for determining a reliability state of a complex electrical network, the electrical network comprising a plurality of interconnected electrical devices, the electrical network being modelled by a single-line representation, the method comprising the following steps:
   a) identifying an undesired event at a given location in the electrical network, the undesired event corresponding to a critical state of the electrical network resulting in partial or total, temporary or permanent unavailability of electrical power at the given location;
   b) traversing at least one subset comprising electrical devices of the plurality of electrical devices of the electrical network starting from the given location;
   c) identifying an electrical device of the subset of the electrical network traversed in step b);
   d) determining a list of events of concern that are associated with the identified electrical device, the events of concern corresponding respectively to causes leading to a failure or malfunction for the identified electrical device and likely to result, alone or in combination, in the undesired event;
   e) determining a total unavailability value associated with the identified electrical device taking into account unavailability rates and repair times respectively associated with each event of concern in the list of events of concern;
   f) repeating steps b) to e), the method being interrupted once a predefined number, which is greater than or equal to two, of electrical protection devices have been traversed in the subset;
   g) calculating a reliability state of the electrical network on the basis of the total unavailability values respectively associated with the traversed electrical devices, the calculated reliability state being available for determination of a need for action;
   h) determining a criticality value for the respective causes of the events of concern, the criticality value representing criticality of the corresponding event of concern;

i) upon a determination of the need for action, providing for application of corrective actions on the electrical network based on the reliability state of the electrical network;

j) prioritizing application of the corrective actions based on the criticality values; and k) causing the corrective actions on the electrical network to be performed.

2. The method according to claim 1, wherein at least one electrical device of the electrical network is chosen from among a transformer, a switch, a circuit breaker, a contactor, a disconnector, a busbar, a battery, a protection relay, monitoring equipment, control equipment and telecommunication equipment.

3. The method according to claim 1, wherein the electrical network comprises at least one real electrical device and at least one virtual electrical device, the virtual electrical device being configured to model a relationship between elements of the electrical network.

4. The method according to claim 3, wherein the method is interrupted once a virtual electrical device is identified in step c) of the method.

5. The method according to claim 1, wherein the given location in the electrical network corresponds to a location of a busbar.

6. The method according to claim 1, wherein, starting from the given location, the subset is traversed upstream, i.e. towards at least one electrical power source of the electrical network, and/or downstream, i.e. towards at least one electrical load of the electrical network.

7. The method of claim 1, wherein when a particular electrical device is traversed several times, the total unavailability value for the particular electrical device is considered to be equal to a previously determined total unavailability value for the particular electrical device when the particular electrical device was previously traversed.

8. The method of claim 1, wherein taking into account the malfunction or unavailability at each of the other electrical devices of the electrical network that affects any of the events of concern in the list of events of concern includes determining whether each of the other electrical devices affects any of the events of concern based on a type of the malfunction or unavailabity of the other device and an upstream or downstream disposition of the other device relative to the identified electrical device.

9. A computer program product comprising a non-transitory computer-readable medium having computer-readable instructions stored thereon which, when executed by a processor, cause the method according to claim 1 to be performed.

10. A processing device on which a computer program comprising instructions for implementing the method according to claim 1 is recorded.

* * * * *